United States Patent [19]

Howell et al.

[11] 4,262,514

[45] Apr. 21, 1981

[54] METHOD AND APPARATUS FOR BENDING A LAMINATED PANEL

[75] Inventors: Norbert C. Howell, Connersville; Walter Tischuk, Richmond, both of Ind.

[73] Assignee: H. H. Robertson Company, Pittsburgh, Pa.

[21] Appl. No.: 87,445

[22] Filed: Oct. 22, 1979

[51] Int. Cl.[3] .............................................. B21D 22/00

[52] U.S. Cl. ........................................... 72/55; 72/54; 72/60; 29/421 R

[58] Field of Search .................. 72/54, 55, 57, 60, 63, 72/379; 52/631; 29/421 R

[56] References Cited

U.S. PATENT DOCUMENTS

| | | | |
|---|---|---|---|
| 1,671,084 | 5/1928 | Meyercord | 52/631 |
| 3,440,790 | 4/1969 | Nerem | 52/631 |
| 3,757,559 | 9/1973 | Welsh | 72/379 |
| 3,881,338 | 5/1975 | Tischuk | 72/46 |
| 3,911,554 | 10/1975 | Ford | 72/379 |
| 4,013,284 | 3/1977 | Demetre | 72/54 |
| 4,045,986 | 9/1977 | Laycock et al. | 29/421 R |
| 4,119,309 | 10/1978 | Majer et al. | 72/54 |

*Primary Examiner*—Leon Gilden
*Attorney, Agent, or Firm*—George E. Manias

[57] ABSTRACT

Apparatus for bending a laminated panel about at least one intended bend line extending parallel with the bottom of a notch formed in the backing of the panel. The panel is retained in engagement with a forming edge which extends along and is at least coextensive with the bend line. The panel and the forming edge are supported spaced-apart from a base. A substantially air-impervious membrane covers the panel and cooperates with the base to provide a substantially closed chamber. Means is provided establishing a pressure within the chamber which is less than the pressure outside of the chamber, whereby the pressure outside of the chamber forces the panel to bend about the forming edge thereby to place the panel portions on opposite sides of the bend line in angular relation relative to each other. A method for bending laminated panels is disclosed.

20 Claims, 15 Drawing Figures

METHOD AND APPARATUS FOR BENDING A LAMINATED PANEL

CROSS REFERENCE TO RELATED APPLICATIONS (IF ANY)

None.

BACKGROUND OF THE INVENTION

1. Field of the Invention

This invention relates to a method and apparatus for bending a laminated panel along one or more selected bend lines.

2. Description of the Prior Art

Laminated panels formed from a pair of facing sheets and an intermediate core are used extensively in the construction of various types of enclosures. A prevalent trend in present-day panel design is the bending of the panels to produce corner, fin and other shaped constructions to provide a desired architectural appearance. Numerous methods for bending such panels have been proposed. In certain prior methods the panel is notched to remove a segment of the inner facing sheet and of the core to provide a notch or groove having a bottom adjacent to the exterior facing sheet; and thereafter the exterior sheet is bent about the bend line to move the exposed core surfaces and the inner facing sheet edges into justaposition. See, for example, U.S. Pat. Nos. 1,671,084 (MEYERCORD); 3,881,338 (TISCHUK); and 3,911,554 (FORD).

A brake-forming operation also has been employed to bend laminated panels. See U.S. Pat. No. 3,757,559 (WELSH).

The use of corner members to facilitate formation of large radius bends in laminated panels, and to hold neighboring sections of the panel in angular relation is known. See, for example, U.S. Pat. No. 3,440,790 (NEREM).

Longitudinal bending of laminated panels to produce corner constructions is presently accomplished on a press providing a brake-forming operation. Where the length of the panel exceeds the brake capacity of the press, double-braking is required. Heretofore, longitudinal bending of laminated panels to produce generaly U-shaped fin constructions could not be formed on a conventional press.

SUMMARY OF THE INVENTION

The principal object of this invention is to provide a novel method and apparatus for bending a laminated panel of any desired length about one or more intended bend lines.

Another object of this invention is to provide apparatus and method wherein gas pressure acting uniformly on the panel bends the panel into the desired angular configuration.

A further object of this invention is to provide apparatus and method wherein the gas within a chamber positioned beneath one or more panel portions is partially evacuated thereby taking advantage of atmospheric pressure to bend the panel.

Still another object of this invention is to provide a novel method and apparatus for bending a panel about two spaced-apart bend lines to produce a generally U-shaped fin structure.

A present invention provides apparatus for bending a laminated panel about one or more intended bend lines. The panel includes a deformable metal skin, a backing adhered to the skin, and at least one notch formed in the backing and having a bottom adjacent to the skin and parallel with the intended bend line. The panel presents first and second panel portions on opposite sides of the intended bend line.

The present invention includes a base which may comprise any suitable work surface, such as the floor of a building. A forming edge is provided which extends along and is at least coextensive with the intended bend line of the panel. The forming edge may, according to one embodiment, be provided by an element of the panel. In accordance with an alternative embodiment, the forming edge is provided by an element of the apparatus. Support means is provided supporting the forming edge and the panel spaced-apart from the base. Retaining means retains the panel engaged with the forming edge during bending. A substantially air-impervious membrane is provided which covers the panel and cooperates with the base to provide a chamber. Means is provided establishing a pressure within the chamber which is less than the pressure outside of the chamber, whereby the pressure outside of the chamber forces the panel to bend about the forming edge thereby to place the panel portions in angular relation relative to each other. To assist in establishing the pressure within the chamber, hold-down means may be provided which urges the perimeter portions of the membrane into substantially airtight engagement with the base. The means establishing a pressure within the chamber preferably comprises means, such as a suction pump, for partially evacuating the gas from the chamber. As the gas within the chamber is partially evacuated, atmospheric pressure acting uniformly on the panel quickly and efficiently bends the panel into the desired angular configuration.

The present invention also provides a method of bending a laminated panel about at least one intended bend line. In accordance with the present method, a panel is provided including a deformable skin and a backing applied to substantially the entire area of one face of the skin. The backing is notched to provide at least one notch having a bottom adjacent to the skin and parallel with the bend line. The panel and a stationary forming edge are supported spaced-apart from a base. The forming edge extends along and is at least coextensive with the bend line. A substantially closed chamber is formed in cooperation with the base. The chamber provides a flexible boundary wall enclosing the panel and overlying the base. A pressure is established within the chamber which is less than the pressure outside of the chamber, whereby the pressure outside of the chamber forces the panel to bend about the forming edge thereby to place the panel portions on opposite sides of the bend line in angular relation relative to each other.

BRIEF DESCRIPTION OF THE PREFERRED EMBODIMENT(S)

Figure 1:
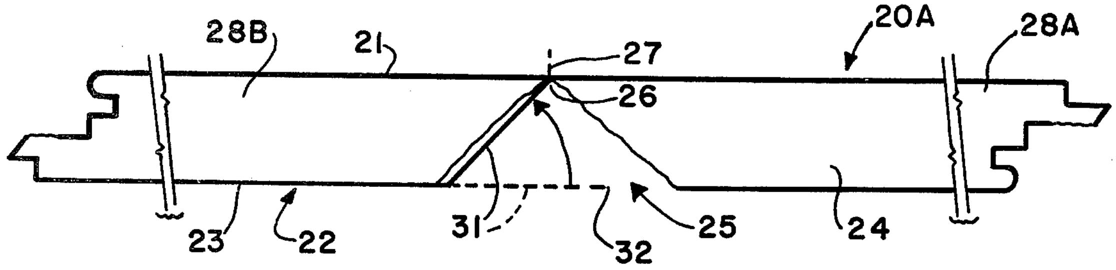
FIGS. 1 through 4 are end views schematically illustrating laminated panels prepared for bending.

FIGS. 1 through 4 illustrate typical laminated panels 20 comprising a deformable skin 21 having a backing 22 applied to substantially the entire area of the hidden face of the skin 21 and adhered thereto.

The backing 22 may comprise an inner skin 23 similar to the skin 21, and a foamed-in-place core 24 filling the space between the skins 21, 23. Alternatively, the backing 22 may comprise only a self-adhering foamed-in-place plastics composition or a preformed block of foamed plastics composition secured to the skin 21 by a film of adhesive. As will become apparent, the present method and apparatus may be used to bend laminated panels of any well-known multiple component type.

The skins 21, 23 may have a thickness in the range of 16 to 22 gage (1.159 to 0.759 mm). The skin may comprise materials such as steel, metal coated steel, stainless steel, aluminized steel, aluminum or the like.

The panels of FIGS. 1 through 4 have been prepared for longitudinal bending. It should be understood that the principles of the apparatus and method of this invention are applicable equally to transverse bending of laminated panels.

Referring to FIG. 1, a notch 25 is formed in the backing 22. The notch 25 has a bottom 26 adjacent to the skin 21 and parallel with the intended bend line schematically illustrated by the dash-dot line 27. After notching, the panel 20 presents first and second panel portions 28A, 28B on opposite sides of the intended bend line 27. As is known, the included angle 29 (FIG. 2) between the cut faces 30 of the backing 22 corresponds to twice the final included angle between the panel portions 28A, 28B after bending. The included angle 29 preferably is more than twice the final included angle to allow slight overbending of the skin 21 to overcome the inherent spring-back tendency of the metal skin 21.

Figure 2:
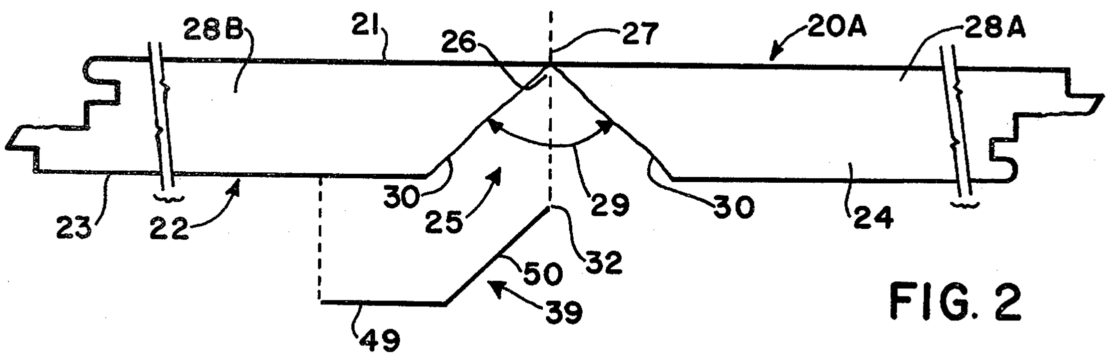

It will be observed in FIG. 1 that a segment 31 of the inner skin 23 is bent upwardly into the notch 25 such that an edge 32 thereof resides at the bottom 26. In accordance with this invention, the edge 32 serves as a forming edge about which the panel 20 is bent to place the panel portions 28A, 28B in angular relation relative to each other. This arrangement may be employed only when the stiffness of the inner skin 23 is sufficient to preclude buckling of the segment 31 during bending of the panel 20.

Where the inner skin 23 has inadequate stiffness, the alternative arrangement of FIG. 2 may be employed. In this instance a central portion of the inner skin 23 is removed. An element 39—forming part of apparatus to be described—is provided formed from material of adequate stiffness. The element 39 comprises an angle-shaped member having a leg 49 and contiguous therewith, a leg 50 presenting the forming edge 32. The inclination of the leg 50 relative to the leg 49 will, of course, conform to that required to provide the angle to which the panel portions 28A, 28B are to be bent.

Figure 3:
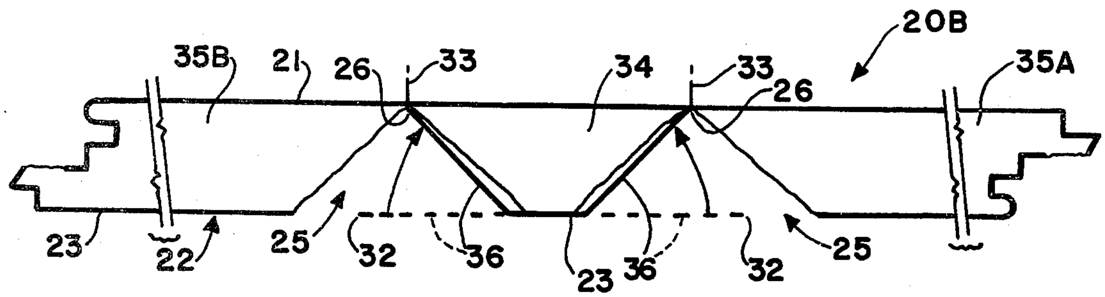
Figure 4:
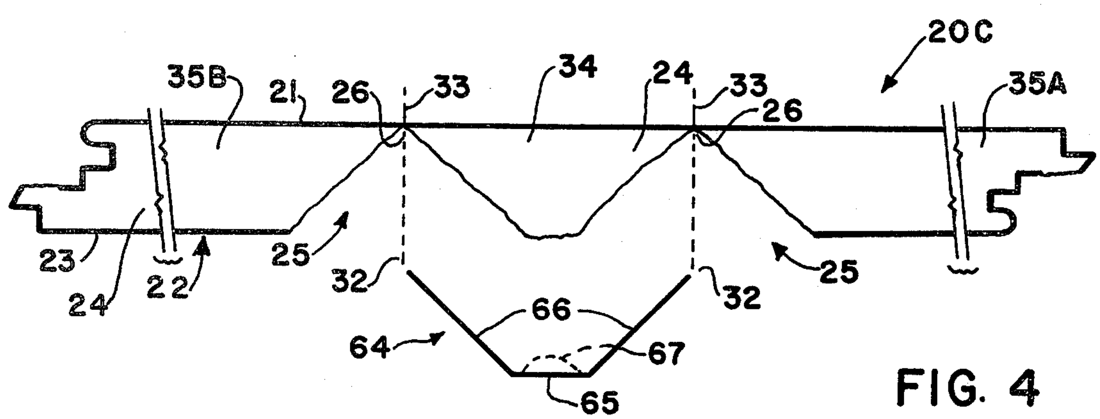
Figure 5:
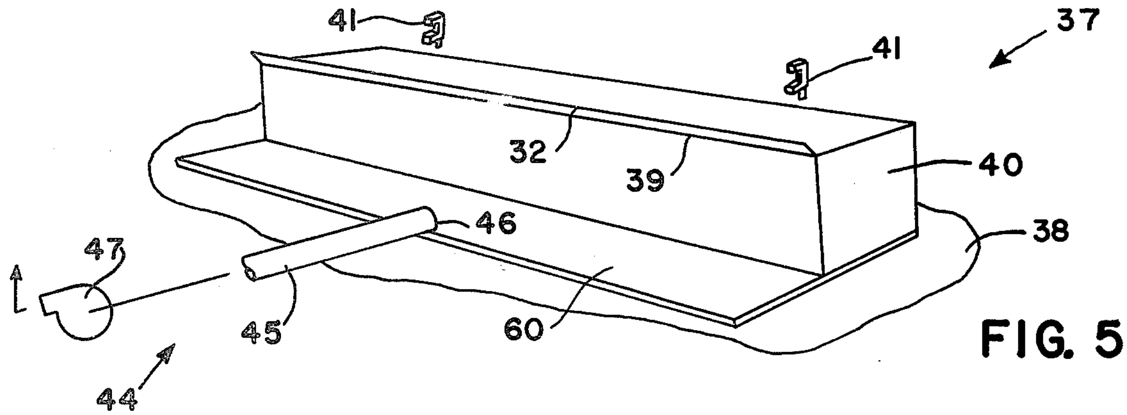
FIGS. 5 through 8 are perspective views schematically illustrating apparatus according to this invention for longitudinal bending of laminated panels such as illustrated in FIGS. 1 and 2.
Figure 6:
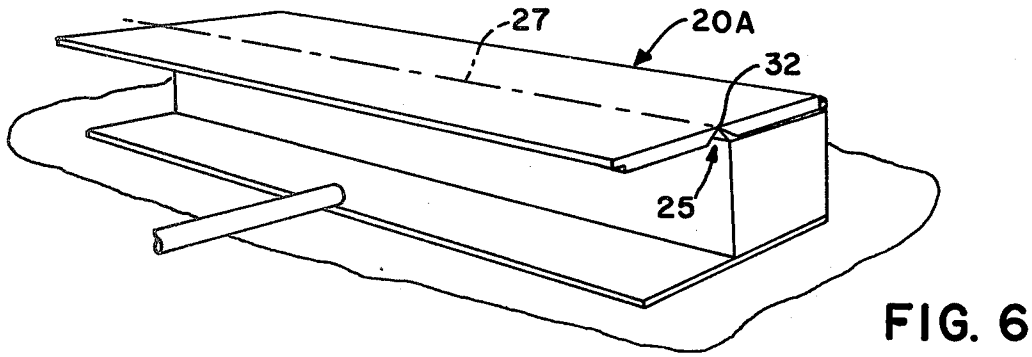
Figure 7:
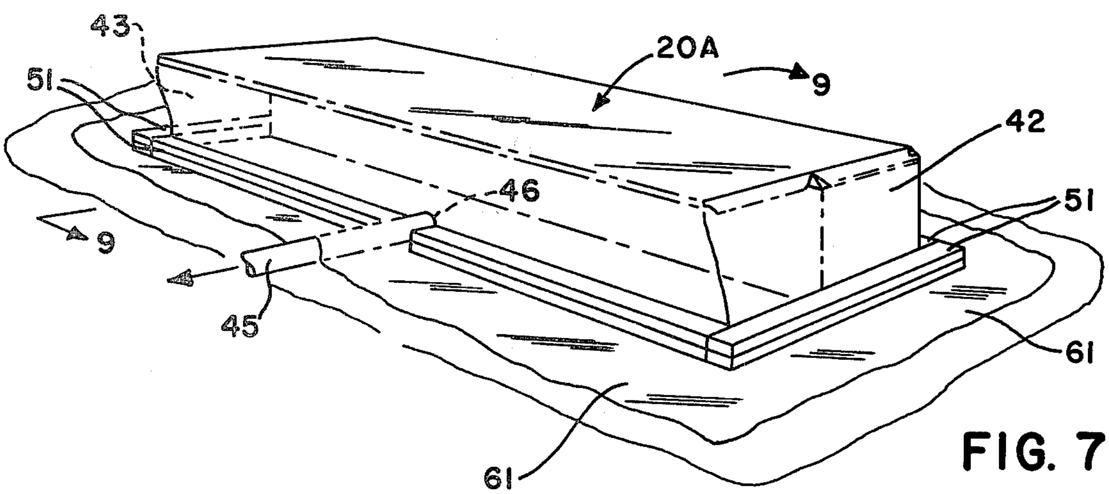
Figure 8:
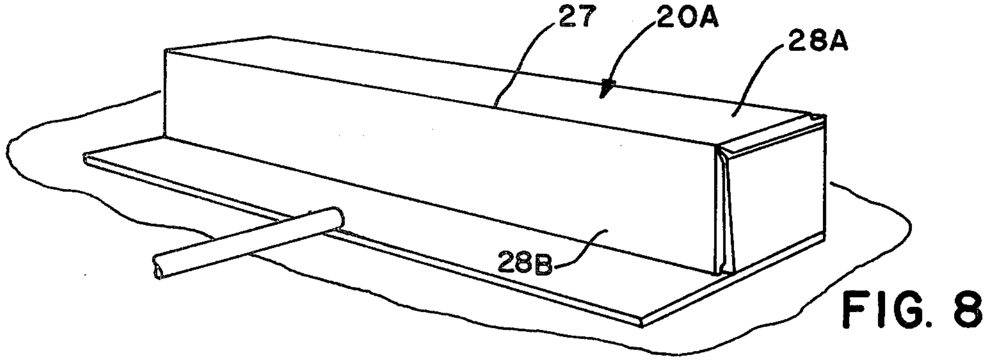
Figure 10:
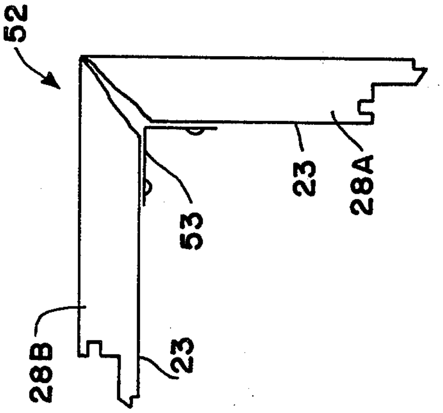
FIG. 10 is an end view schematically illustrating a corner structure formed by bending the panel of FIG. 1.

FIGS. 3 and 4 illustrate laminated panels 20B, 20C prepared for bending about two intended bend lines represented by the dash-dot lines 33. The panels 20B, 20C are provided with two notches 25 each having a bottom 26 adjacent to the outer skin 21 and parallel with one of the intended bend lines 33. The panels 20B, 20C present a central panel portion 34 intermediate of the notches 25 and lateral panel portions 35A, 35B on opposite sides of the central panel portion 34.

It will be observed in FIG. 3 that segments 36 of the inner skin 23 are bent upwardly into the notches 25 so as to present the forming edges 32 at the bottom 26 of each notch 25.

Again where the inner skin 23 has inadequate stiffness, the alternative arrangement of FIG. 4 may be employed. In this instance segments of the inner skin 23 are removed. A generally U-shaped element 64 is provided formed from material of adequate stiffness. The element 64 includes a central segment 65 and upwardly inclined legs 66 each providing one of the required forming edges 32. The element 64 is installed on the panel 20C with the forming edges 32 at the bottoms 26 of the notches 25. The central segment 65 may be secured to the core 24, for example, by one or more beads 67 of a suitable adhesive, such as a hot-melt glue.

FIGS. 5 to 9 illustrate apparatus 37 according to this invention for bending a laminated panel longitudinally (or transversely) about a single intended bend line. The apparatus 37 will be described in connection with the panel 20A of FIG. 2. The various components of the apparatus 37 include a base 38 which may comprise a work surface such as the floor of a building. A forming edge 32 is provided by the element 39 which, in this embodiment, is a component of the apparatus 37. The forming edge 32 extends along the intended bend line 27 and is substantially coextensive with the panel 20A. Support means, such as a box-like structure 40, supports the forming edge 32 and the panel 20A (FIGS. 6, 9) spaced-apart from the base 38. The box-like structure 40 may be stabilized against overturning during bending of the panel 20A, in any suitable manner, for example, by the addition of a base plate 60. Plural retaining means, such as quick-acting clamps, schematically illustrated at 41 in FIGS. 5, 9, retain the panel 20A engaged with the forming edge 32. A substantially air-impervious member 42 (FIGS. 7, 9) covers the panel 20A and cooperates with the base 38 to form a substantially closed chamber 43 having flexible boundary walls (the membrane 42) overlying and surrounding the panel 20A.

Means 44 (FIGS. 5, 9) is provided for establishing a pressure within the chamber 43 which is less than the pressure outside of the chamber 43. The means 44 may comprise, for example, a conduit 45 having a conduit end 46 presented within the chamber 43, and means such as a suction pump schematically illustrated at 47 for partially evacuating the gas from the chamber 43. Hold-down means, such as frame elements 51, may be provided to urge the perimeter portions 61 (FIG. 7) of the membrane 42 into substantially sealed engagement with the base 38. The arrangement assists in the rapid and efficient operation of the suction pump 47.

Figure 9:
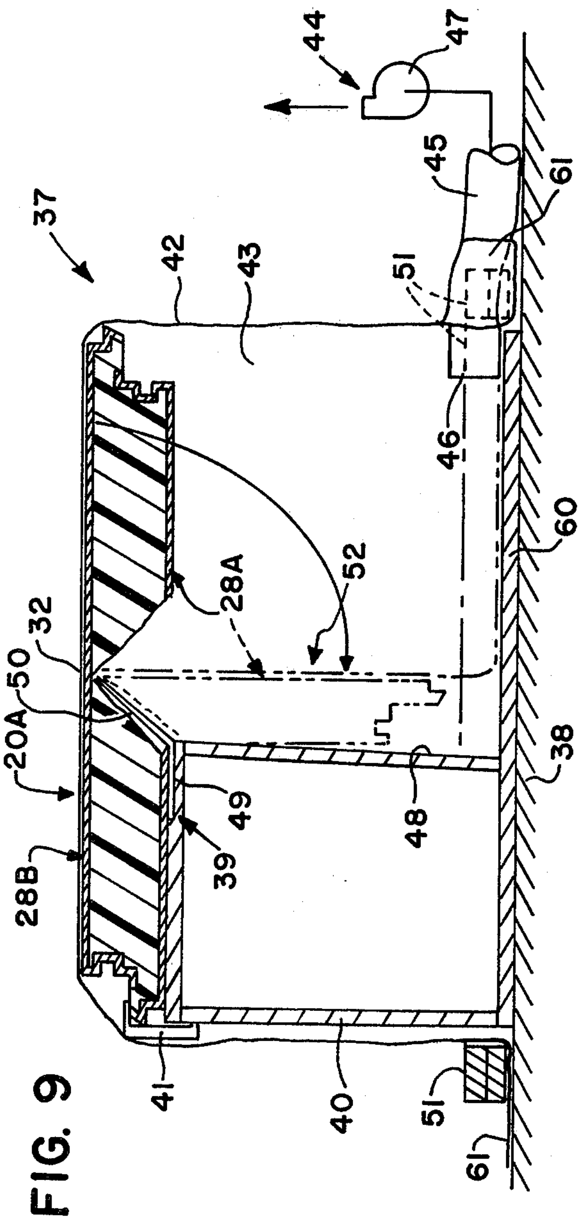
FIG. 9 is a cross-sectional view taken along the line 9—9 of FIG. 7.

It will be observed in FIG. 9 that when the pressure within the chamber 43 is lowered, the pressure outside of the chamber 43, that is, atmospheric pressure, forces the panel 20A to bend about the forming edge 32 thereby to place the panel portions 28A, 28B in angular relation relative to each other. The panel 20A is thus bent to form a corner structure 52.

It will be observed in FIG. 9 that a box-like structure 40 presents a bend-to-face 48 which serves as abutment means engageable by at least one of the panel portions to establish the desired angular relationship between the panel portions 28A, 28B. The bend-to-face 38 may be inclined so as to permit overbending of the panel 20 about the bend line 32 to compensate for the inherent spring-back tendency of the metal skin 21 whereby the panel portions 28A, 28B will reside in substantially the desired angular relationship.

The box-like structure 40 preferably comprises a substantially airtight chamber and is therefore not a part of the chamber 43. This arrangement significantly reduces the volume of the chamber 43 and hence the volume of gas which must be partially evacuated by the suction pump 47.

After the panel 20A is bent, the frame elements 54, the membrane 42, the clips 41 and the corner structure 52 are removed. One or more clips 53 (FIG. 11) may be secured to the inner skin 23 to maintain the panel portions 28A, 28B in the desired angular relationship.

Figure 13:
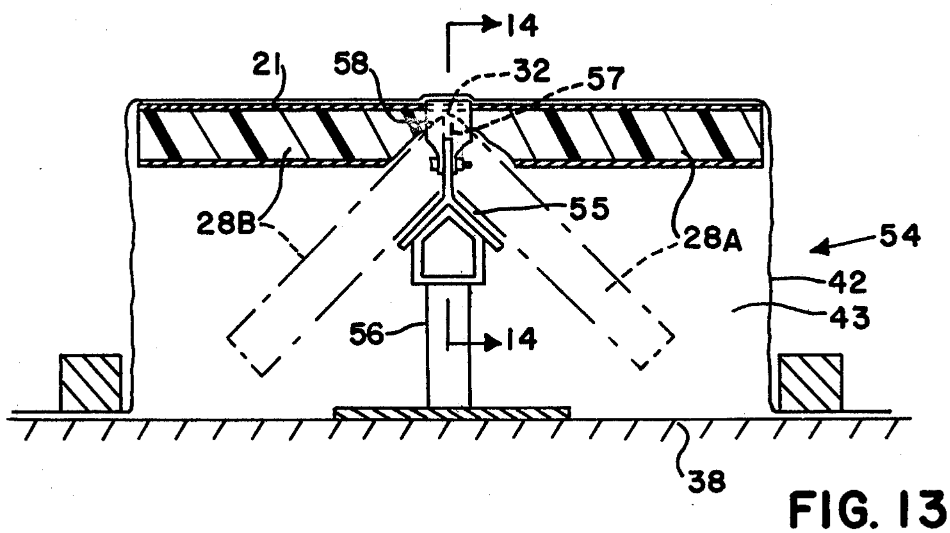
FIGS. 13 and 15 are cross-sectional views, similar to FIG. 9, schematically illustrating alternative arrangements of the present apparatus.
Figure 14:
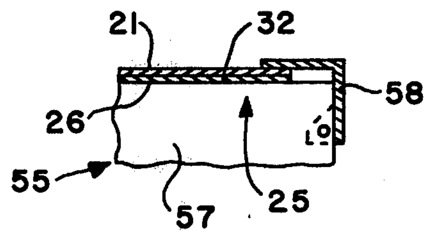
FIG. 14 is a cross-sectional view taken along the line 14—14 of FIG. 13.

FIGS. 13 and 14 illustrate apparatus 54 incorporating an inverted Y-shaped element 55 supported on an open web frame 56 spaced-apart from the base 38. The element 55 includes an upstanding leg 57 providing the forming edge 32 which is presented at the base 26 (FIG. 14) of the notch 25. Retaining means, such as clips 58 provided at each end of the panel 20A, retain the panel 20A engaged with the forming edge 32. When the pressure within the chamber 43 is lowered, the panel 20A bends about the forming edge 32. The panel portions 20A, 20B move toward each other into the desired angular presentation.

Figure 15:
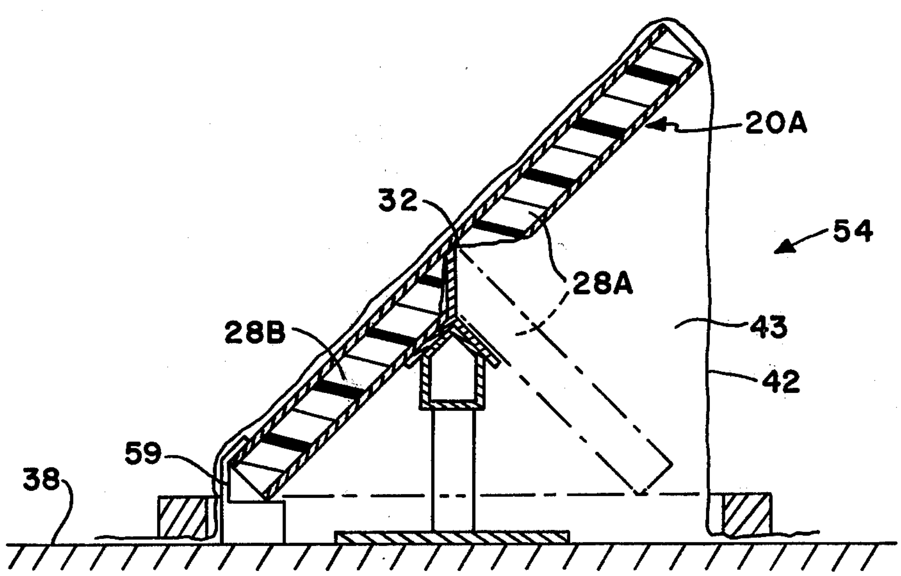

FIG. 15 illustrates the apparatus 54 wherein retaining means, such as one or more clips schematically illustrated at 59, retain the panel portion 28B fixed with respect to the forming edge 32 and with respect to the base 38. When the pressure within the chamber 43 is lowered, the panel 20A bends about the forming edge 32. The panel portion 28A moves downwardly about the forming edge 32 into the desired angular relation relative to the fixed panel portion 28B.

Figure 12:
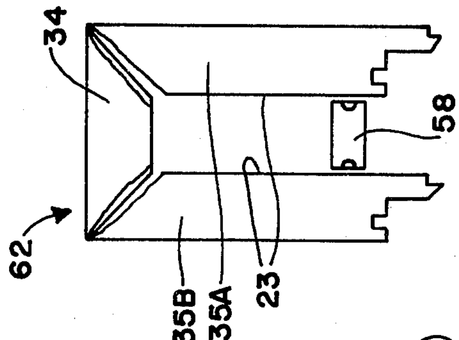
FIG. 12 is an end view schematically illustrating a fin structure formed by bending the panel of FIGS. 3 or 4.

The present invention also provides apparatus 68 (FIG. 11) for bending a laminated panel about two spaced bend lines to form a fin structure 62 such as illustrated in FIG. 12.

Figure 11:
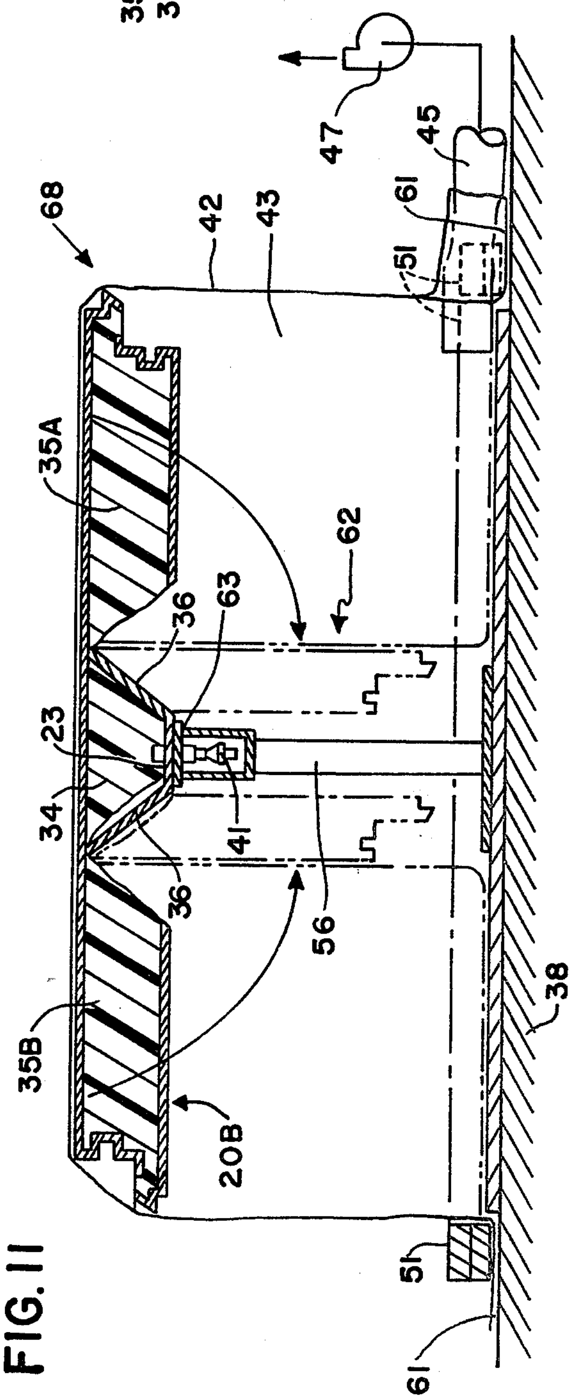
FIG. 11 is a view, similar to FIG. 9, illustrating apparatus according to this invention for longitudinal bending of laminated panels such as illustrated in FIGS. 3 and 4.

Referring to FIG. 11, the support means comprises a mounting plate 63 carried by an open web frame 56 in spaced-apart relation with the base 38. In this arrangement, the panel 20B of FIG. 3 has the inner skin segment 23′ of the central panel portion 34 engaged with the mounting plate 63. Preferably, both ends of the inner skin segment 23′ are secured to the mounting plate 63 by the quick acting clamps 41 (only one illustrated in FIG. 11). Thus arranged, the lateral panel portions 35A, 35B extend laterally from the central panel portion 34 and are unsupported. The membrane 42 is then draped over the panel 20B such that perimeter portions 63 thereof overlie the base 38. The hold-down means (frame elements 51) are installed over the perimeter portions 61 of the membrane. On activation of the suction pump 47, the pressure within the chamber 43 is lowered whereby the pressure outside of the chamber 43 forces the lateral panel portions 35A, 35B to bend about the forming edges 32 into angular relation relative to the central panel portion 34. The fin structure 62 is now formed and may be removed from the apparatus 68. As shown in FIG. 12, one or more clips 69 may be secured to the confronting segments of the inner skin 23 to maintain the panel portions 35A, 35B in the desired angular relation relative to the central panel portion 34.

The present invention also provides a method of bending a laminated panel about at least one selected bend line. Referring to FIG. 9, the present method includes the steps of providing a panel 20 including a deformable metal skin 21 and a backing 22 applied to substantially the entire area of one face of the skin 21. The backing 22 is notched to provide at least one notch 25 having a bottom 26 adjacent to the skin 21 and parallel with the intended bend line 27. The panel 20 and a stationary forming edge 32 are supported spaced-apart from a base 38. The forming edge 32 extends along and is at least coextensive in length with the bend line 27. A substantially closed chamber 43 having a flexible boundary wall enclosing the panel 20 and overlying the base 38 is formed in cooperation with the base 38. The chamber 43 is formed by applying a substantially air-impervious membrane 42 over the panel 20 such that the perimeter portions 61 thereof overlie the base 38. Thereafter a pressure is established within the chamber 43 which is less than the pressure outside of the chamber 43, whereby the pressure outside of the chamber 43 forces the panel 20 to bend about the forming edge 32 thereby to place the panel portions 28A, 28B on opposite sides of the bend line in angular relation relative to each other.

We claim:

1. Apparatus for bending a laminated panel about at least one intended bend line, wherein said panel includes a deformable skin, a backing adhered to said skin, and at least one notch formed in said backing, said notch having a bottom adjacent to said skin and parallel with said bend line, said panel having first and second panel portions on opposite sides of said bend line, said apparatus comprising:
- a base;
- a forming edge extending along and being at least coextensive with said bend line;
- support means supporting said forming edge and said panel spaced-apart from said base;
- retaining means retaining said panel engaged with said forming edge;
- a substantially air-impervious membrane covering said panel and cooperating with said base to provide a chamber; and
- means establishing a pressure within said chamber which is less than the pressure outside said chamber, whereby the pressure outside of said chamber forces said panel to bend about said forming edge thereby to place said panel portions in angular relation relative to each other.

2. The apparatus of claim 1 including abutment means engaged by at least one of said panel portions to establish a desired angular relation between said panel portions.

3. The apparatus of claim 1 wherein said means establishing a pressure comprises means for partially evacuating the gas from said chamber.

4. The apparatus of claim 1 wherein said forming edge is provided by an element of said apparatus.

5. The apparatus of claim 1 wherein said forming edge is provided by an element of said panel.

6. The apparatus of claim 1 wherein said retaining means retains the first panel portion in fixed position relative to said forming edge and to said base.

7. The apparatus of claim 1 including hold-down means urging perimeter portions of said membrane into contact with said base.

8. Apparatus for bending a laminated panel about selected spaced-apart bend lines, wherein said panel includes a deformable skin, a backing adhered to said skin, and two notches formed in said backing, each of said notches having a bottom adjacent to said skin and parallel with one of said bend lines, said panel having a central panel portion intermediate said notches and having lateral panel portions on opposite sides of said central panel portion, said appartus comprising:

a base;

forming edges extending along said bend lines and being at least coextensive with said bend lines;

support means supporting said forming edges and said panels spaced-apart from said base;

retaining means retaining said central portion in fixed position relative to said forming edges and to said base;

a substantially air-impervious membrane covering said panel and cooperating with said base to provide a chamber; and means establishing a pressure within said chamber which is less than the pressure outside said chamber, whereby the pressure outside said chamber forces said panel to bend about said forming edges thereby to place lateral panel portions in angular relation relative to said central panel portion.

9. The apparatus of claim 8 wherein said means establishing a pressure comprises means for partially evacuating the gas from said chamber.

10. The apparatus of claim 8 wherein said forming edges are provided by element of said panel.

11. The apparatus of claim 8 including hold-down means urging perimeter portions of said membrane into contact with said base.

12. A method of bending a laminated panel about at least one intended bend line, comprising:

providing a panel including a deformable skin and a backing applied to substantially the entire area of one face of said skin;

notching said backing to provide at least one notch having a bottom adjacent to said skin and parallel with said bend line;

supporting said panel and a stationary forming edge spaced-apart from a base, said forming edge extending along and being at least coextensive with said bend line;

forming with said base a substantially closed chamber having a flexible boundary wall enclosing said panel and overlying said base; and establishing a pressure within said chamber which is less than the pressure outside of said chamber, whereby the pressure outside of said chamber forces said panel to bend about said forming edge thereby to place the panel portions on opposite sides of said bend line in angular relation relative to each other.

13. The method of claim 12 wherein said pressure within said chamber is established by partially evacuating the gas from said chamber.

14. The method of claim 12 wherein said substantially closed chamber is formed by applying a substantially air-impervious membrane over said panel such that perimeter portions thereof overlie said base.

15. The method of claim 14 including the step of urging said perimeter portions along substantially the entire length thereof, into substantially sealed engagement with said base.

16. The method of claim 12 including the step of retaining a panel portion on one side of said bend line in fixed position relative to said forming edge and to said base prior to establishing said pressure within said chamber.

17. A method of bending a laminated panel about spaced-apart bend lines, comprising providing a panel including a deformable skin and a backing applied to substantially the entire area of one face of said skin;

notching said backing to provide two spaced-apart notches each having a bottom adjacent to said skin and parallel with one of said bend lines, said panel having a central panel portion intermediate of said notches and having lateral panel portions on opposite sides of said central panel portion;

supporting said panel and stationary forming edges spaced-apart from a base, said forming edges extending along and being at least coextensive with said bend lines;

forming with said base, a substantially closed chamber having a flexible boundary wall overlying said panel; and establishing a pressure within said chamber which is less than the pressure outside of said chamber whereby the pressure outside of said chamber forces said panel to bend about said forming edges thereby to place said lateral panel portions in angular relation relative to said central panel portion.

18. The method of claim 17 wherein said pressure within said chamber is established by partially evacuating the gas from said chamber.

19. The method of claim 17 wherein said chamber is formed by applying a substantially air-impervious membrane over said panel, said membrane having perimeter portions overlying said base.

20. The method of claim 19 including the step of urging said perimeter portions along substantially the entire length thereof into sealed engagement with said base.

* * * * *